United States Patent Office 2,783,275
Patented Feb. 26, 1957

2,783,275

PROCESS OF PREPARING VINYLSULFOFLUORIDE

Otto Scherer and Paul Fritz Schächer, Frankfurt am Main, Germany, assignors to Farbwerke Hoechst Aktiengesellschaft vormals Meister Lucius & Brüning, Frankfurt am Main, Germany, a German company No Drawing. Application September 10, 1953, Serial No. 379,477

5 Claims. (Cl. 260—543)

The present invention relates to vinylsulfofluoride and to a process of preparing it.

We have found that vinylsulfofluoride is a very valuable compound which can be used for example, as an intermediate for the preparation of plastics.

We have furthermore found, that vinylsulfofluoride is obtained by reacting a compound of the formula $$ClCH_2—CH_2—SO_2X$$

in which X stands for a substituent of the group consisting of chlorine and fluorine, with an alkali fluoride.

The reaction may be carried out for example by mixing, while stirring, one of the chloroethane-sulfohalides mentioned above with an alkali fluoride without using a solvent, and gently heating the mixture to a temperature between about 50° C. and about 150° C. For avoiding any by-reaction by hydrolysis it is advantageous to start from dry alkali fluorides which suitably may also be used in a finely subdivided form. The batch may be heated to boiling under reflux, or there may be operated in a closed vessel, since during the reaction substantially no gaseous components are formed. The reactions occur according to the following equations:

$$ClCH_2CH_2SO_2F + 2KF \rightarrow CH_2=CHSO_2F + KHF_2 + KCl$$
$$ClCH_2CH_2SO_2Cl + 3KF \rightarrow CH_2=CHSO_2F + KHF_2 + 2KCl$$

The vinylsulfofluoride formed constitutes a colorless liquid boiling at 119° C. under a pressure of 760 mm. of mercury and possessing a very violent tear-exciting action.

The following analytical results were obtained for the product:

C: Calculated 21.82     H: Calculated 2.73
   Found 21.82             Found 2.82
S: Calculated 29.09     F: Calculated 17.27
   Found 28.94             Found 16.9

The compound simultaneously contains an ethylene linkage and a sulfofluoride group, and can, therefore, be subjected to various chemical reactions.

It is advantageous to use an excess up to 50 percent of the theory of alkali fluoride.

The beta- chloroethane-sulfohalides used as starting materials can, for example, be prepared by chlorinating ethanesulfochloride or ethane-sulfofluoride by the action of actinic light.

The following examples serve to illustrate the invention, but they are not intended to limit it thereto:

*Example 1*

In a steel boiler provided with a stirrer and a reflux condenser 1465 grams of beta-chloroethane-sulfofluoride with 1750 grams of dry potassium fluoride are mixed. During this operation the temperature of the mixture rises from room temperature to 70° C. to 80° C. While stirring is continued, the mixture is heated to 120° C. for 1 hour under reflux by means of an oil bath. The vinylsulfofluoride formed is then distilled, preferably with application of slightly reduced pressure. After a repeated distillation a pure vinyl-sulfochloride is obtained in an amount of 889 grams, i. e. 81 percent of the theoretical yield.

Instead of potassium fluoride any other alkali fluoride may be used. It is also possible to operate in a closed vessel; in that case a slight superatmospheric pressure is observed at 130° C.

*Example 2*

In the same apparatus as that described in Example 1 200 grams of potassium fluoride and 165 grams of beta-chloro-ethane-sulfochloride are heated for ½ hour in an oil bath to 130° C. Crude vinylsulfofluoride is distilled off and the pure product is obtained in a good yield by redistillation.

We claim:

1. In the process for preparing vinylsulfofluoride, the step which comprises causing anhydrous alkali fluoride to act upon a compound of the formula $$ClCH_2—CH_2—SO_2X,$$

in which X stands for a substituent of the group consisting of chlorine and fluorine at a temperature between about 50° C. and about 150° C.

2. A process according to claim 1 in which a stoichiometric excess of alkali fluoride is used.

3. In the process for preparing vinylsulfofluoride, the step which comprises causing anhydrous potassium fluoride to act upon a compound of the formula $$ClCH_2—CH_2—SO_2X,$$

in which X stands for a substituent of the group consisting of chlorine and fluorine at a temperature between about 50° C. and about 150° C.

4. A process according to claim 3 in which said compound reacted with potassium fluoride is $ClCH_2CH_2SO_2F$.

5. A process according to claim 3 in which said compound reacted with potassium fluoride is $ClCH_2CH_2SO_2Cl$.

References Cited in the file of this patent

UNITED STATES PATENTS

| | | |
|---|---|---|
| 2,174,856 | Johnson | Oct. 3, 1939 |
| 2,276,097 | Salzberg | Mar. 10, 1942 |
| 2,653,973 | Heydrick | Sept. 29, 1953 |